United States Patent Office 2,776,303
Patented Jan. 1, 1957

2,776,303
PROCESS FOR THE MANUFACTURE OF ISOERGOSTERONE

Joseph Green, London, Anthony Fenwick Daglish, Reigate, and Victor David Poole, West Green, Crawley, England, assignors to Vitamins Limited, London, England, a British company No Drawing. Application October 6, 1954, Serial No. 460,768

Claims priority, application Great Britain October 28, 1953

6 Claims. (Cl. 260—397.2)

This invention relates to a process for the manufacture of isoergosterone.

Isoergosterone (4:6:22-ergostatriene-3-one: II) is a useful compound for the preparation of intermediates for the synthesis of progesterone, testosterone, adrenal cortical hormones and the like, as it can be prepared from the readily available steroid ergosterol, and because it possesses an unsaturated side chain which facilitates its degradation to the side chains of the above hormones, and because the unsaturated ketonic system of rings A and B can be easily modified to the 4-en-3-one system typical of these hormones.

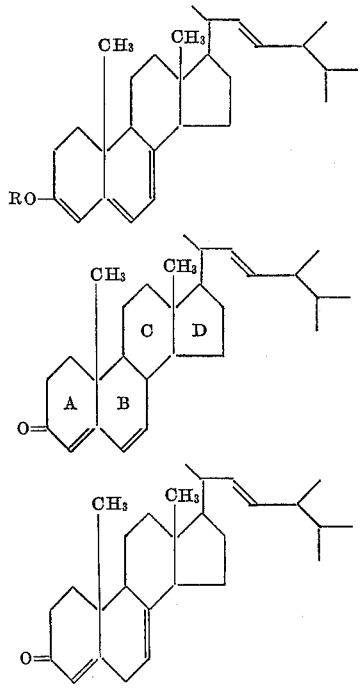

Previous methods of preparation of isoergosterone have been difficult to repeat and have given low yields. Thus the method of Wetter and Dimroth (Ber., (1937) 70, 1665) is reported by Barton, Cox and Holmes (J. C. S. (1949), 1771) to give only a 20% yield of isoergosterone, and the latter have made isoergosterone in only 60% yield by treatment of rigorously purified ergosterone (III) with hydrogen chloride. Heilbron, Kennedy, Spring and Swain (J. C. S. (1938), 869) prepared isoergosterone by the alkaline hydrolysis of ergosterone enol acetate (I:R=CH₃CO), but their method gives unreliable yields of material which is difficult to purify.

We have now found that isoergosterone may be produced in very high yield by the hydrolysis of ergosterone enol esters by sulphuric acid dissolved in an alkanol containing not more than four carbon atoms in the molecule in the presence or absence of water.

Thus, according to the process of the present invention for the manufacture of isoergosterone, an ergosterone enol ester is subjected to hydrolysis by sulphuric acid dissolved in an alkanol containing not more than four carbon atoms in the molecule in the presence or absence of water.

The sulphuric acid may, for example, be dissolved in methanol or ethanol.

Preferably the enol ester employed is ergosterone enol acetate. Ergosterone enol acetate can be readily prepared by the Oppenauer oxidation of ergosterol, followed by acetylation of the ergosterone thereby produced. However, other enol esters such as the propionate may be used. Ergosterone enol propionate, which is a new compound, may be prepared by the reaction of propionic anhydride in pyridine on ergosterone. Thus the process of the present invention makes isoergosterone readily available from ergosterol.

The following examples illustrate the invention:

1. A mixture of ergosterone enol acetate (100 g.) and methanol (5,000 ml.) was treated with a solution of sulphuric acid (150 ml., sp. gr. 1.84) in water (125 ml.), and then refluxed. After half an hour a precipitate formed and when this had redissolved, the solution was heated for one hour longer. After cooling to room temperature an equal volume of water was added and the crude isoergosterone which separated was collected. The product was dissolved in ether and treated with successive washes of water until neutral. Evaporation of the ether left a pale yellow solid, which on crystallisation from methanol gave pure isoergosterone, M. P. 108–109° C. (82 g.) λ max: 283 mμ; log ε: 4.44.

2. A mixture of ergosterone enol acetate (20 g.), ethanol (1,000 ml.) and sulphuric acid (60 ml.) was heated at reflux for 3 hours. After cooling, the reaction mixture was worked up as described in Example 1 to give isoergosterone (14 g.), M. P. 102–5° C.

3. Ergosterone enol propionate (I: R=CH₃OH₂CO) was prepared by the reaction of propionic anhydride in pyridine on ergosterone. The propionate crystallised as white plates from ethyl acetate and had M. P. 117–119° C., (α)_D—143°. The enol propionate was hydrolysed exactly as described for the enol acetate in Example 1, to give 96% of isoergosterone (M. P. 101–104° C.). Recrystallisation from methanol gave pure isoergosterone (M. P. 106–108° C.).

What we claim is:

1. A process for the manufacture of isoergosterone which comprises subjecting an ergosterone enol ester of an aliphatic carboxylic acid containing not more than three carbon atoms in the molecule to hydrolysis by treatment with sulphuric acid dissolved in an alkanol containing less than five carbon atoms in the molecule.

2. A process for the manufacture of isoergosterone which comprises subjecting an ergosterone enol ester of an aliphatic carboxylic acid containing not more than three carbon atoms in the molecule to hydrolysis by treatment with sulphuric acid dissolved in an alkanol containing less than five carbon atoms in the molecule in the presence of water.

3. A process for the manufacture of isoergosterone which comprises subjecting an ergosterone enol ester of an aliphatic carboxylic acid containing not more than three carbon atoms in the molecule to hydrolysis by treatment with sulphuric acid dissolved in methanol.

4. A process for the manufacture of isoergosterone which comprises subjecting an ergosterone enol ester of an aliphatic carboxylic acid containing not more than three carbon atoms in the molecule to hydrolysis by treatment with sulphuric acid dissolved in ethanol.

5. A process for the manufacture of isoergosterone which comprises subjecting ergosterone enol acetate to hydrolysis by treatment with sulphuric acid dissolved in an alkanol containing less than five carbon atoms in the molecule.

6. A process for the manufacture of isoergosterone which comprises subjecting ergosterone enol propionate to hydrolysis by treatment with sulphuric acid dissolved in an alkanol containing less than five carbon atoms in the molecule.

References Cited in the file of this patent

UNITED STATES PATENTS 2,248,438    Ruzicka  ---------------- July 8, 1941

FOREIGN PATENTS 497,540    Canada  --------------- Nov. 10, 1953

OTHER REFERENCES

Antonucci: Jour. Org. Chem. 16, 1453–7 (1951).
Heilbron: Jour. Chem. Soc. (1938), 869–76.